Patented Sept. 13, 1932

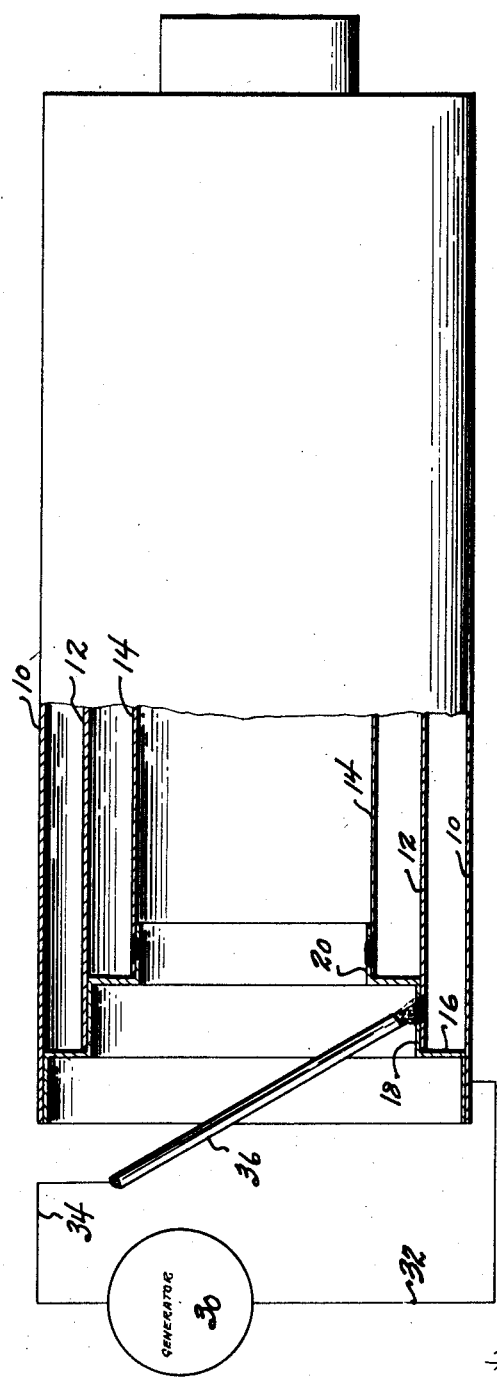

1,877,195

UNITED STATES PATENT OFFICE

VIRGIL OLDBERG AND ARTHUR C. BORN, OF DETROIT, MICHIGAN, ASSIGNORS TO OLDBERG MANUFACTURING COMPANY, OF DETROIT, MICHIGAN, A CORPORATION OF MICHIGAN

METHOD OF MAKING MUFFLERS

Application filed March 16, 1931. Serial No. 522,885.

This invention relates to muffler construction and more particularly to novel methods for welding a head onto the shells of the muffler.

This invention also relates to a novel article of manufacture, namely, a muffler having one of its heads secured to the shells in a novel manner.

An object of this invention is a muffler including a plurality of telescoped shells having heads on their ends, one of the heads having an inner cylindrical portion engaging and disposed within an inner shell and secured thereto by a metallic arc spot weld.

A still further object is a novel method of manufacturing or assembling a muffler including a plurality of telescoped shells, a first head of any desired form and a second head provided with a cylindrical portion disposed within and engaging an inner one of the shells, the method of comprising the steps of securing the first head to the shells, securing the second head to the outermost shell, and third, welding the inner cylindrical portion to the second head to the inner shell which it engages by a metallic arc spot weld.

Still further objects will readily occur to those skilled in the art upon reference to the following description and the accompanying drawing in which The single figure shows in partial section a muffler made in accordance with the invention, together with apparatus diagrammatically illustrating the method of manufacturing the same.

Referring to the drawing, it will be seen that the muffler includes an outer shell 10, an intermediate or inner shell 12, and a third shell 14 inside the shell 12, all of the shells being relatively telescoped and each shell being longer than the one therewithin. The muffler is provided with a plurality of heads, one of which may be of any desired form and the other of which, referenced 16, includes one or more cylindrical portions 18 and 20 disposed within and engaging respectively the shells 12 and 14 at their ends.

In assembling the muffler it is the general practice to secure one of the heads to the shells in any desired fashion, and then to secure the other head to the shells. No difficulty is found in securing the first head to the shells or in securing the second head to the outermost shell. However, when it comes to securing the cylindrical portions 18 and 20 to the shells 12 and 14, conventional methods of welding cannot be employed for the reason that access to the shells 12 or 14 is prevented. Accordingly, it is proposed to secure the portions 18 and 20 to the shells 12 and 14 in a novel manner, the same being known as the metallic arc spot welding process.

For this purpose the welding generator 30 has one of its lines 32 connected to the muffler and the other of its lines 34 connected to the metallic electrode 36, the latter being of a steel alloy or composition. The ends of the electrode 36 is brought to the cylindrical portion 18 and an arc is established, the same serving to fuse a spot of the portion 18 and an adjacent spot on the shell 12 to produce a spot weld at this point, the spots of welding being indicated by the solid black portions on the drawing.

In view of the intense heat developed by the arc, it is desirable and even necessary to establish the arc for a comparatively short time and accordingly great speed in the manufacture of mufflers employing this process can be effected.

It is to be observed that the metallic arc spot welding process differs from the acetylene torch spot welding process which includes the steps of burning holes in the parts to be welded and then filling these with a molten material which binds or welds the edges of the holes to each other and at the same time fills up the holes.

The metallic arc spot welding method described in the foregoing, has proven desirable and efficient and has been effective in reducing the cost of manufacturing mufflers.

Now having described the invention and the preferred embodiment thereof, it is to be understood that the said invention is to be limited, not to the specific details herein set forth, but only by the scope of the claim which follows:

What we claim is:—

The method of making a muffler comprising a plurality of relatively telescoped preformed cylindrical shells and two heads, the first of which may be of any desired form and the second of which has radially spaced outer and inner cylindrical portions, the inner one of which laps the end of an inner one of the shells in such a manner that a pressure spot weld cannot be employed to weld the inner portion of the second head to the end of the shell which it laps, when both heads are on the shell, which comprises the following steps, performed in the order given: (a) Disposing the first head in assembled relation with the ends of the preformed cylindrical shells, (b) Disposing the second head in assembled relation with the other ends of the preformed cylindrical shells and (c) Welding the inner cylindrical portion of the second head to the end of the inner shell which it laps by a metallic arc spot weld, employing the muffler as one electrode and a metallic rod as the other, the arc being drawn between the latter and spots on the inner cylindrical portion of the second head.

In testimony whereof, we sign this specification.

VIRGIL OLDBERG.
ARTHUR C. BORN.